(12) United States Patent
Adireddy et al.

(10) Patent No.: US 8,995,940 B2
(45) Date of Patent: Mar. 31, 2015

(54) FILTERING DATA IN A WIRELESS RECEIVER SYSTEM

(75) Inventors: Srihari Adireddy, Austin, TX (US); Brian D. Green, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1948 days.

(21) Appl. No.: 11/528,203

(22) Filed: Sep. 27, 2006

(65) Prior Publication Data

US 2008/0076365 A1    Mar. 27, 2008

(51) Int. Cl.
*G06F 3/033* (2013.01)
*H04L 12/66* (2006.01)

(52) U.S. Cl.
CPC ..................................... *H04L 12/66* (2013.01)
USPC .......................................... 455/130; 455/131

(58) Field of Classification Search
USPC ......... 370/328, 218–220, 241–253, 280, 294, 370/314, 336, 337, 344, 347, 351–430; 455/339, 213, 266, 180.1, 130, 127.1, 455/69, 260; 375/143, 152, 231–236, 350
See application file for complete search history.

(56) References Cited

U.S. PATENT DOCUMENTS

| | | | |
|---|---|---|---|
| 5,809,399 A * | 9/1998 | Tuutijarvi et al. ............ | 455/63.1 |
| 6,014,554 A * | 1/2000 | Smith ............................ | 455/340 |
| 7,082,295 B2 * | 7/2006 | Chien ............................ | 455/260 |
| 2003/0114128 A1* | 6/2003 | Haapoja et al. ............... | 455/307 |
| 2004/0013122 A1* | 1/2004 | John Kott et al. ............ | 370/401 |
| 2005/0058232 A1* | 3/2005 | Murakami et al. ........... | 375/350 |
| 2005/0117489 A1* | 6/2005 | Serizawa .................... | 369/59.21 |
| 2006/0023696 A1* | 2/2006 | Berger et al. ................. | 370/352 |

* cited by examiner

*Primary Examiner* — Chuong A Ngo
(74) *Attorney, Agent, or Firm* — Trop, Pruner & Hu, P.C.

(57) ABSTRACT

A technique includes receiving data that is communicated in a frame over a wireless network and processing the data through a filter. A response of the filter is changed during the processing.

15 Claims, 7 Drawing Sheets

FILTERING DATA IN A WIRELESS RECEIVER SYSTEM

BACKGROUND

The invention generally relates to filtering data in a wireless receiver system.

Data may be communicated over a wireless network (a cellular network, for example) in the form of frames. For example, pursuant to the Global System for Mobile communications (GSM) standard, frames may be communicated in a Time Division Multiple Access (TDMA) format using eight time slots. Conventionally, each time slot may be assigned to a particular user. For example, a particular cellular phone may be assigned to time slot 3 and as a result, the cellular telephone may receive its incoming data from time slot 3 of received frames.

Conventionally, data of the same type is communicated in the same session. For example, a cellular phone may receive speech data, or data that is commonly referred to as "circuit switched data," in frames in one session and receive "packet switched" data in frames in another session. The packet switched data may be, for example, data that is associated with a particular Internet website, picture, etc. Thus, in the past, circuit switched and packet switched data have been communicated in different sessions.

A relatively recent GSM standard provides a Dual Transfer Mode (DTM), a feature that permits circuit and packet switched data to be communicated in the same session. For example, in the same session, time slot number 3 may be reserved for circuit switched data, and slots 4 and 5 (as an example) may be reserved for packet switched data.

SUMMARY

In an embodiment of the invention, a technique includes receiving data that is communicated in a frame over a wireless network and processing the data through a filter. A response of the filter is changed during the processing.

In another embodiment of the invention, an apparatus includes a filter and a controller. The filter receives a frame of data from a wireless network. The controller regulates a response of the filter based on a type associated with a portion of the data that is being processed by the filter.

In yet another embodiment of the invention, a system includes a radio and a digital signal processor. The radio receives a frame of data from a wireless network. The digital signal processor selects filter coefficients for the filter based on a type that is associated with a portion of the data being processed by the filter.

Advantages and other features of the invention will become apparent from the following drawing, description and claims.

DETAILED DESCRIPTION

Figure 1:
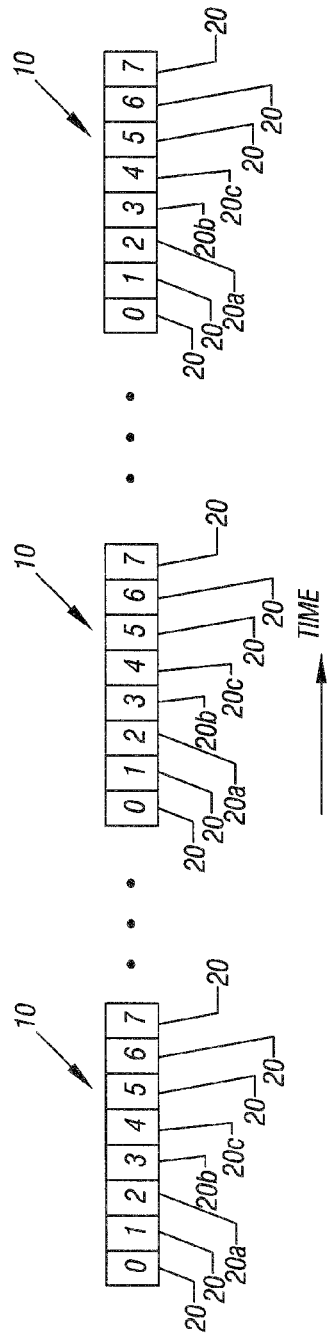
FIG. 1 is an illustration of frames of data received from a wireless communication network according to an embodiment of the invention.

Referring to FIG. 1, in accordance with embodiments of the invention described herein, data may be received over a receive channel by a wireless device in the form of frames 10 during a particular session. The wireless device may be assigned one or more time slots of each frame so that during each frame, the wireless device samples data from its assigned time slots. By way of example, in accordance with some embodiments of the invention, each frame 10 includes eight time slots 0-7, and time slots 2, 3 and 4, corresponding to reference numerals 20a, 20b and 20c, are assigned to the wireless device. As a more specific example, the time slot 20a may correspond to circuit switched data, such as speech data received from a telephone, and time slots 20b and 20c may correspond to packet switched data, which may correspond to Internet-type data, computer data, image data, etc. Thus, in accordance with some embodiments of the invention, the wireless device may provide a dual transfer mode (DTM) feature in which both packet and circuit switched data may be communicated in the same frame.

A potential challenge in receiving two different types of data during the same frame and in contiguous slots is that the filtering requirements may change with the data type. For example, it may be desirable for the wireless device to route received packet switched data through a wider band filter and route received circuit switched data through a relatively more narrow band filter. It is noted that other filtering parameters, such as the amount of rolloff, the sharpness of the filtering characteristic, etc., may depend on the data type that is associated with the incoming data, such as whether the incoming data is circuit switched data or packet switched data (as an example).

Figure 2:
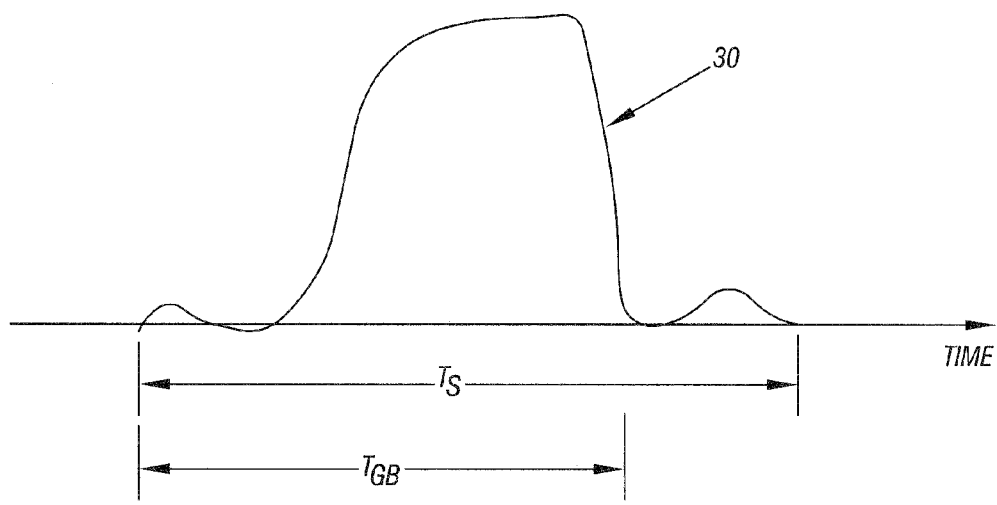
FIG. 2 depicts a time response of a filter according to an embodiment of the invention.

Thus, the wireless device might change the filtering that is applied to the incoming data to accommodate the data type. One solution to accommodate this change may be to use two different filters: one filter for packet switched data and another filter for circuit switched data. However, referring also to FIG. 2, which depicts a time response 30 of a filter, a difficulty with switching filters is that the settling time (called "$T_S$" in FIG. 2) for a given filter may have a longer duration than the guard band duration (called "$T_{GB}$"), which is the duration between adjacent time slots 20. Thus, referring also to FIG. 1, if the time slot 20a is associated with, for example, circuit switched data, and the time slot 20b is associated with packet switched data, then only the $T_{GB}$ guard band duration separates this data. The $T_{GB}$ guard band may be less than the settling time $T_S$ of the filter, as depicted in FIG. 2.

The above-described filtering change is accomplished in accordance with embodiments of the invention described herein by changing filter coefficients of a digital filter while keeping the signal processing path of the filter primed with the data. Due to these conditions, a filtering change over time that is less than the $T_S$ settling time may be achieved, without affecting the integrity of the filtered data.

Figure 3:
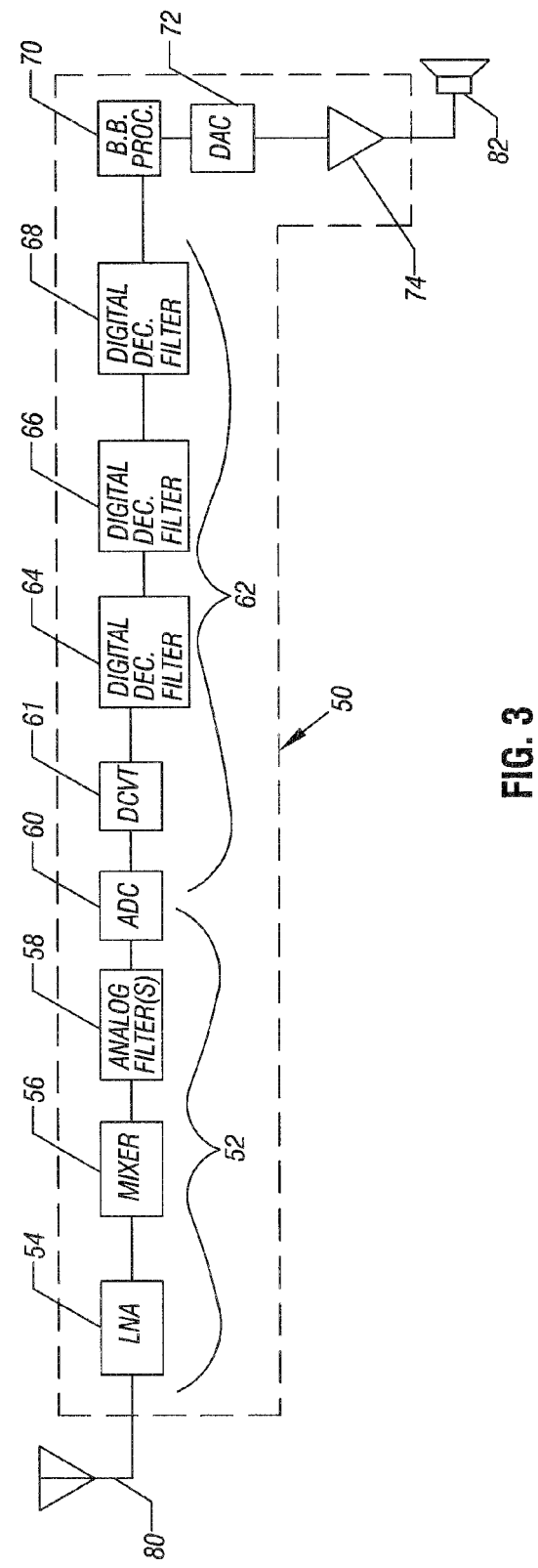
FIG. 3 depicts a schematic diagram of a receive path of a cellular telephone according to an embodiment of the invention.

More specifically, referring to FIG. 3, in accordance with some embodiments of the invention, a wireless device includes a receive processing path 50 that includes an analog front end portion 52 and a downstream digital processing portion 62. As described further below, the analog processing portion 52 receives a radio frequency (RF) signal from an antenna 80 and downconverts the received RF signal into an intermediate frequency (IF) signal that is provided to the digital portion 62. The digital portion 62 further downconverts the IF signal into baseband frequency. Further processing by a baseband processor 70 demodulates the signal that is furnished by the digital portion 62. The baseband processing by the baseband processor 70 produces a signal, which is furnished to a digital-to-analog converter (DAC) 72. The DAC 72 provides a corresponding analog signal that is amplified (via an amplifier 74) and played over a speaker system 82 of the wireless device.

The receive processing path 50 is a "low IF system" in which part of the incoming signal is filtered by one or more analog filter(s) 58 (of the analog portion 52) and digital decimation filters 64, 66 and 68 (of the digital portion 62). Due to the division between analog and digital, the analog filter(s) 58 do not change their filtering characteristics, regardless of whether the incoming signal is associated with packet switched or circuited switched data. However, in accordance with embodiments of the invention described herein, the response of least one of the digital decimation filters 64, 66 and 68 is controlled based on the type of incoming data. Because the filtering change is accomplished through the changing of digital filter coefficients while keeping the main signal processing path of the filter unchanged, the change may occur in a shorter time than the settling time $T_S$ of the filter. As described further herein, in accordance with some embodiments of the invention, the last digital decimation filter 68 has a response that is changed depending on the type (circuit switched or packet switched) of the incoming data.

Turning now to the more specific details of the receive path 50, in accordance with some embodiments of the invention, the analog portion 52 includes a low noise amplifier (LNA) 54 that receives the RF signal from the antenna 80. A mixer 56 downconverts the RF signal that is provided by the LNA 54 to the IF frequency. The analog filter(s) 58 then filter the output signal provided by the mixer 56 for such purposes of taking care of blockers that have relatively large frequency offsets from the desired frequency. It is noted that the digital filtering that is performed further downstream by the digital decimation filters 64, 66 and 68 takes care of the blockers and interferers that are closer in frequency as well as in-band filtering. The filter(s) 58 provide an analog output signal to an analog-to-digital converter (ADC) 60, which provides a digital output signal that is received by the digital portion 52.

In accordance with some embodiments of the invention, the digital portion 52 of the receiver 50 includes a downconverter 61 that further downconverts to baseband frequency the signal that is provided by the ADC 60. The downconverter 61 provides the resultant signal to the digital decimation filters 64, 66 and 68, which perform the above-described filtering to produce a filtered digital baseband signal that is provided to a baseband processor 70.

Figure 4:
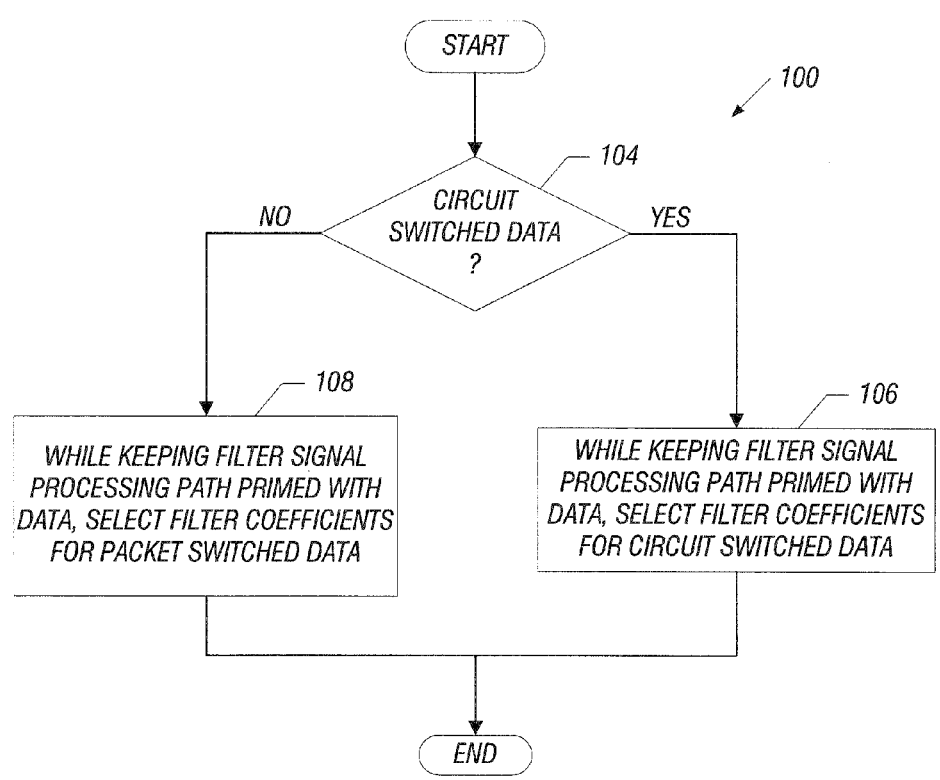
FIG. 4 is a flow diagram depicting a technique to regulate a response of a filter according to an embodiment of the invention.

Referring to FIG. 4, to summarize, in accordance with some embodiments of the invention, in connection with the receive path 50 (see FIG. 3), a decision is made (diamond 104) whether the data to be filtered is circuit switched data. If so, filter coefficients to filter the circuit switched data are selected while keeping the filter signal processing path primed with data. Alternatively, if the incoming data to be filtered is packet switched data (pursuant to diamond 104), the filter coefficients for packet switched data are selected pursuant to block 108 while keeping the filter signal processing path primed with data. The data may be identified as being packet switched or circuit switched based on the TDMA slot number from which the wireless device received the data.

Figure 5:
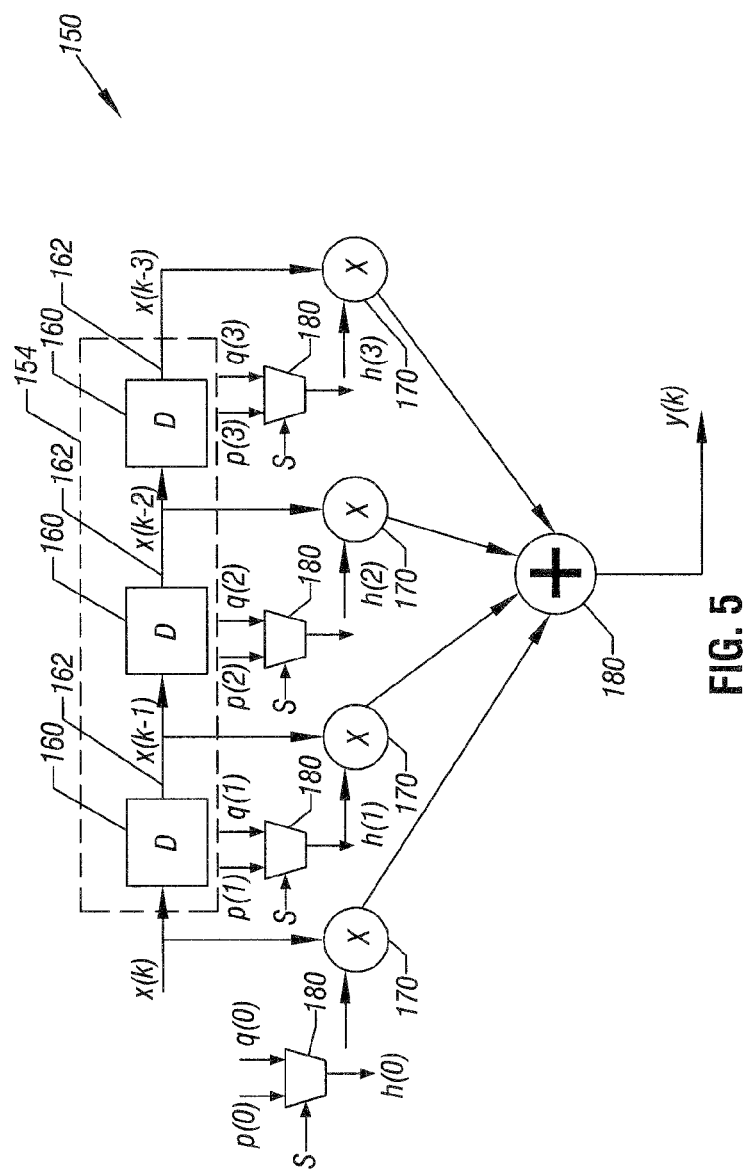
FIG. 5 is a schematic diagram of a tapped filter according to an embodiment of the invention.

As a more specific example, FIG. 5 depicts an exemplary embodiment 150 of a digital filter in accordance with embodiments of the invention. In particular, the digital filter 150 may be the digital decimation filter 68 (see FIG. 3) of the receive path 50 in accordance with some embodiments of the invention. The digital decimation filters may be finite impulse response (FIR) or infinite impulse response (IIR) filters, depending on the particular embodiment of the invention.

The digital filter 150 is a tapped filter, which includes a main signal path, or delay line, which is formed from delay elements 160. The input of the delay line, as well as the output from each delay element 160 in the delay line is tapped, or fed, to a corresponding multiplier 170. The multiplier 170 multiplies the tapped signal by a particular filter coefficient that is selected by an associated multiplexer 180. Depending on whether circuit switched or packet switched data is being processed, the multiplier 180 selects one or two different filter coefficients, which is provided to the multiplier 170 to be multiplied by the tapped signal. The outputs from the multipliers 170 are furnished to an adder 180, which furnishes the filtered signal, y(k). As can be seen from FIG. 5, the p(0), p(1), p(2) and p(3) coefficients are associated with one data type and the q(0), q(1), q(2) and q(3) coefficients are associated with the other data type.

In accordance with some embodiments of the invention, the multipliers 170 may be replaced with a single multiplier, with input signals to the single multiplier being time multiplexed. Thus, many variations are possible and are within the scope of the appended claims.

Figure 6:
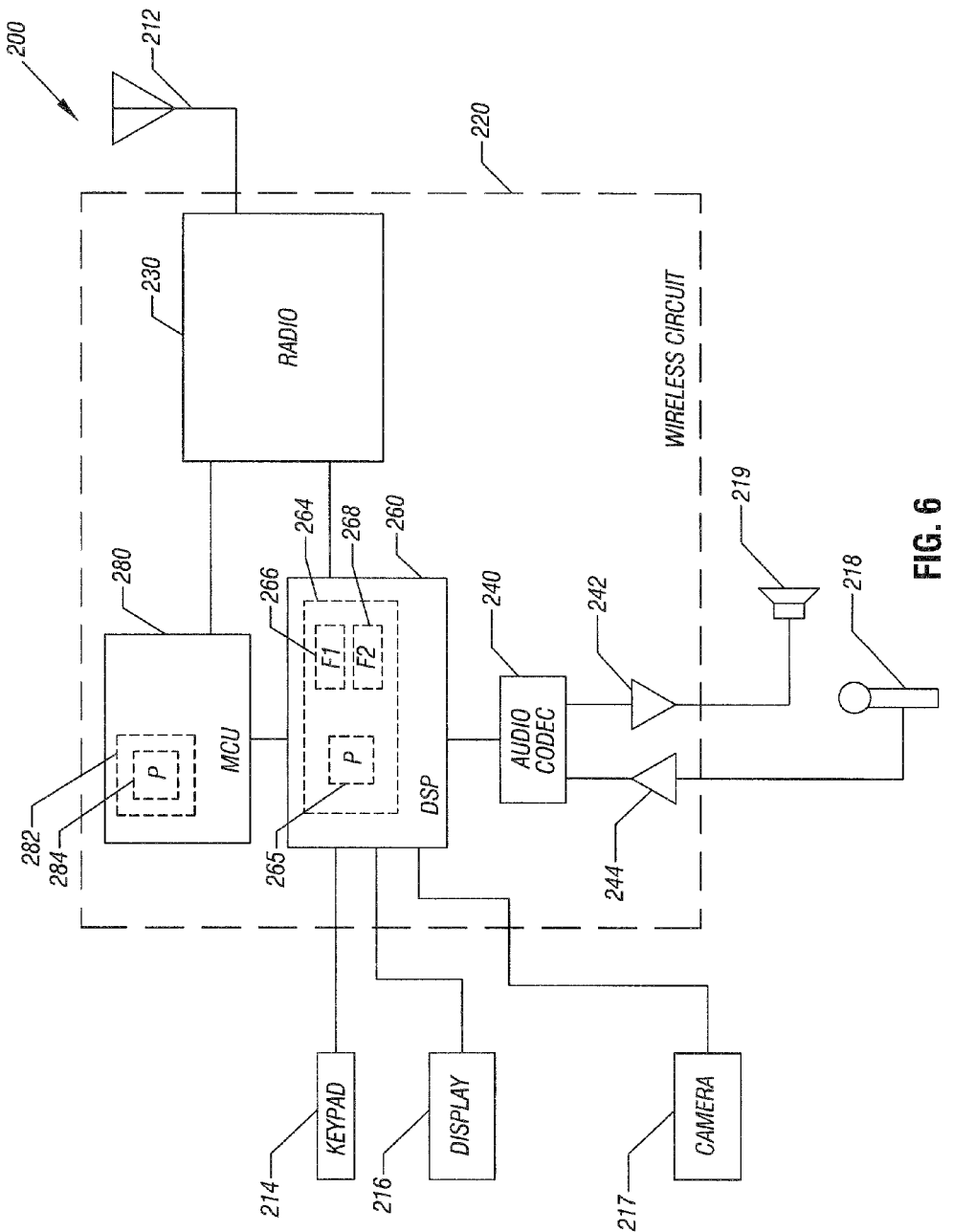
FIG. 6 is a schematic diagram of a cellular telephone according to an embodiment of the invention.

FIG. 6 depicts an exemplary embodiment 200 of a cellular telephone in accordance with some embodiments of the invention. The cellular telephone 200 includes a wireless circuit 220 that may be fabricated, for example, on a single semiconductor die and may be part of a semiconductor package. Alternatively, the wireless circuit 220 may be formed from more than one semiconductor package and may be performed from more than one die inside a single semiconductor package. Thus, many different embodiments are possible and are within the scope of the appended claims.

In accordance with some embodiments of the invention, the wireless circuit 220 includes a transceiver, or radio 230, which furnishes and receives RF signals from an antenna 212. Thus, frames, which correspond to the DTM standard may be received by the radio 230. In accordance with some embodiments of the invention, the radio 230 forms the analog portion 52 of the receive path 50 (see FIG. 3).

Thus, in accordance with some embodiments of the invention, the radio 230 furnishes a digital IF signal, which may be further processed by a digital signal processor (DSP) 260. In accordance with some embodiments of the invention, the DSP 260 forms the digital decimation filters 64, 66 and 68 and performs the baseband processing of the baseband processor 70. However, in accordance with other embodiments of the invention, the wireless circuit 220 may include one or more components, such as digital filters, outside of the DSP 260. Thus, the embodiment depicted in FIG. 6 is merely an example for purposes of simplifying the following description.

In accordance with some embodiments of the invention, the DSP 260 includes a memory 264 (a read only memory (ROM), for example), which stores program instructions 265. The program instructions 265 may, when executed by a processor of the DSP 260, may cause the DSP 260 to perform a variety of different routines and functions, at least one of which may be to perform the filtering functions of particular digital filter. Thus, in accordance with some embodiments of the invention, through the execution of the program instructions 265, the DSP 260 may perform the filtering of the digital decimation filter 68.

Pursuant to its filtering functions, the DSP 260 may implement the digital tapped filter 150 of FIG. 5. It is noted that other embodiments of the invention, the tapped filter 150 may reside outside of the DSP 260.

For embodiments of the invention in which the DSP 260 implements a tapped filter, filter coefficients 266 and 268 may be stored in the memory 264. In this regard, the DSP 260, in its filtering processing routine, selects either the filter coefficients 264 or the filter coefficients 266, depending on whether the incoming signal to be processed is a circuit switched or a packet switched data stream. The adjustment of the pointer to select either the filter coefficients 266 or the filter coefficients 268 is performed by a microcontroller unit (MCU) 280 of the wireless circuit 220, in accordance with some embodiments of the invention.

More specifically, in accordance with some embodiments of the invention, the MCU 280 includes a memory 282 that stores a program 284, which when executed by a processor of the MCU 280, causes the MCU 280 to select the appropriate pointer, which is used by the DSP 260 in its filtering function. In this regard, the MCU 280, in accordance with some embodiments of the invention, identifies the particular TDMA time slot that is being processed by the DSP 260. If the time slot corresponds to circuit switched data, then the MCU 280 selects one of the filter coefficients 266, 268 and selects the other of the filter coefficients 266, 268 if the time slot being processed corresponds to packet switched data. Alternatively, the DSP 260 may select the pointer and the select coefficients 266 and 268, in other embodiments of the invention. Thus, many variations are possible and are within the scope of the appended claims.

Among its other features, in accordance with some embodiments of the invention, the wireless circuit 220 includes an audio codec 240 that processes incoming and outgoing speech for the cellular telephone 200. In this regard, in accordance with some embodiments of the invention, the audio codec 240 receives an incoming analog audio signal from an amplifier 244, which receives a corresponding analog audio signal from a microphone 218. In the other direction, the audio codec 240, in accordance with some embodiments of the invention, furnishes an analog audio output signal to an amplifier 242 that drives a speaker system 219 of the cellular telephone 200.

Among its other features, the cellular telephone 200 includes a keypad 214 that is coupled to the DSP 260 for purposes of entering user selections into the cellular telephone 200, may include a display 216 for purposes of displaying various information on the cellular telephone 200 and may also include a camera 217 that is coupled to the DSP 260 for purposes of capturing image data for the cellular telephone 200. Besides controlling the selection of filter coefficients for the DSP 260, the MCU 280 may perform a variety of other functions, such as executing application software (email software, calendaring software, etc.) for the cellular telephone 200 and generally coordinating overall activities of the wireless circuit 220.

Figure 7:
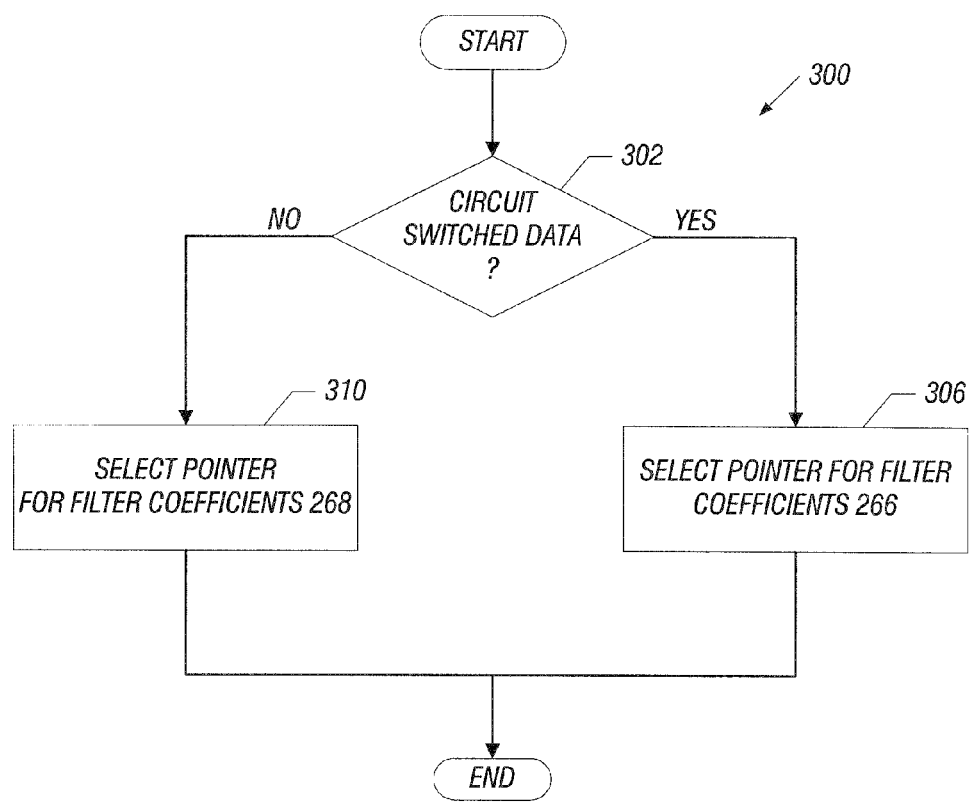
FIG. 7 is a flow diagram depicting a technique to control the selection of filter coefficients according to an embodiment of the invention.

In accordance with some embodiments of the invention, the MCU 280 may perform a technique 300 that is generally depicted in FIG. 7. In this regard, the MCU 280 may determine (diamond 302) whether the incoming data to be filtered is circuit switched data. If so, the MCU 280, selects the pointer for the filter coefficients 266 (assumed to be filter coefficients for the circuit switched data in this example). Otherwise, the MCU 280 selects (block 310) the pointer for the coefficients 268.

Figure 8:
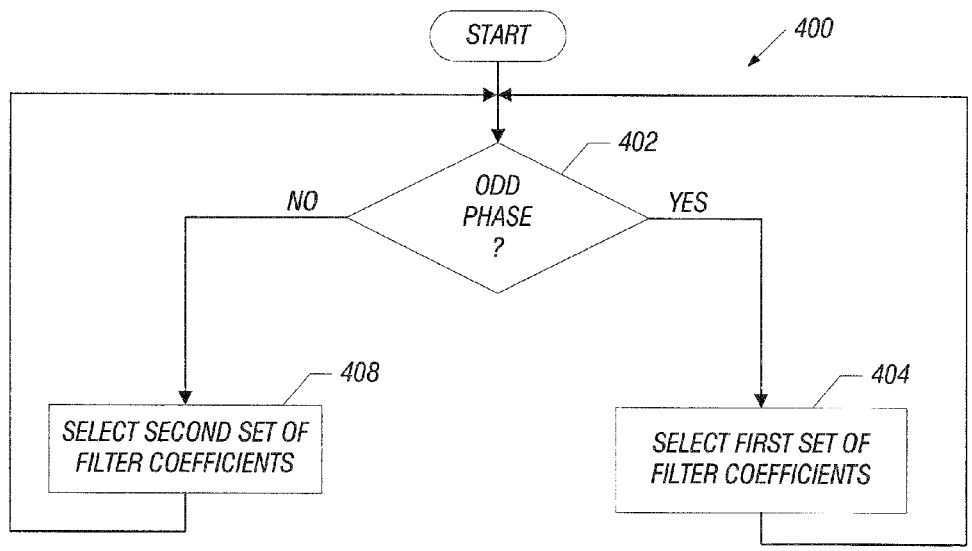
FIG. 8 is a flow diagram depicting a technique to filter incoming data based on a phase associated with the data according to an embodiment of the invention.

Other embodiments are within the scope of the appended claims. For example, in accordance with other embodiments of the invention, the response of a particular digital filter may be changed to generate two sets of data: a first set of data, which is derived from processing the incoming stream with a wideband signal; and a second set of data, which is derived from processing the incoming stream of data with a narrow band signal. More specifically, referring back to FIG. 3, in accordance with some embodiments of the invention, the downsampling that is otherwise performed by the digital decimation filter 68 may be turned off so that the filter provides an oversampled output bit stream (i.e., two times the normal rate). This creates a two phase output, and thus, the digital filtering that is performed depends on the particular phase of the output. Referring also to FIGS. 6 and 8, in this regard, in accordance with these embodiments of the invention, the MCU 280 determines (diamond 402) whether the data that is being filtered is in an odd phase and if so, selects a first set of filter coefficients. Otherwise, the data being processed is the even phase, and the MCU 280 selects the second set of filter coefficients, pursuant to block 408.

Figure 9:
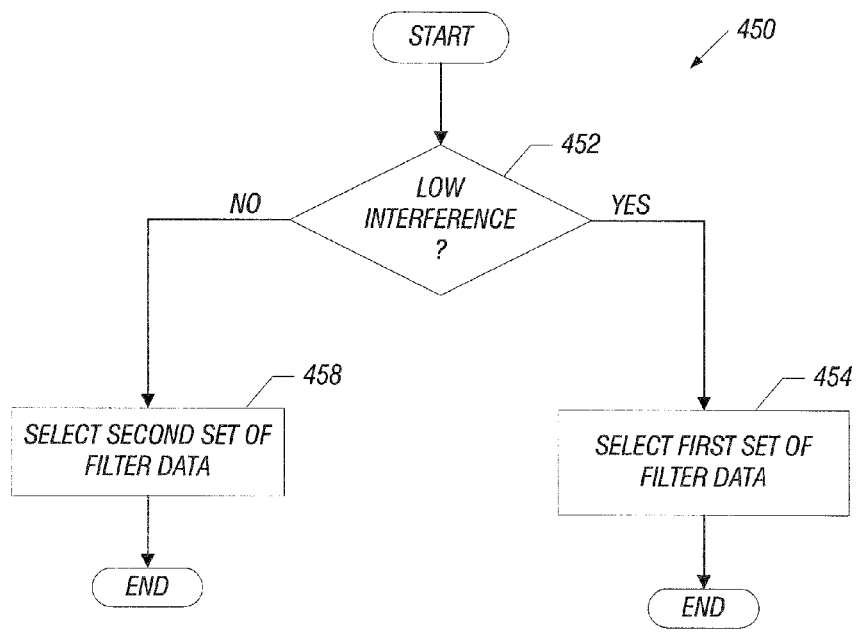
FIG. 9 is a flow diagram depicting a technique to select a filtered data set based on channel interference according to an embodiment of the invention.

The result of the above-described two phase filtering is that the particular filtered data set that is selected depends on channel conditions. In this regard, pursuant to a technique 450 that is depicted in FIG. 9, if the MCU 280 determines (diamond 452) that low channel interference is present, then the MCU 280 selects (block 454) the first set of filtered data, such as the wideband filter data. Otherwise, if the channel has relatively higher interference, then the MCU 280 selects the second set of filtered data (data produced by narrow band filtering, for example), pursuant to block 458.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving data communicated in a frame over a wireless network, the data comprising data associated with a first data type and data associated with a second data type; and
processing the data communicated in the frame through a filter, the processing comprising:
filtering the data associated with the first data type using a first frequency response for the filter; and
filtering the data associated with the second data type using a second frequency response different from the first frequency response for the filter.

2. The method of claim 1, wherein the filtering of the data associated with the first data type occurs before the filtering of the data associated with the second data type, and the processing comprises changing coefficients of the filter after the filtering of the data associated with the first data type and before the filtering of the data associated with the second data type.

3. The method of claim 1, wherein the processing comprises changing between a wide band filter and a narrow band filter.

4. The method of claim 1, wherein the processing comprises selectively changing a characteristic of the filter based on a data type associated with a slot of the frame.

5. The method of claim 1, wherein the processing comprises:
selectively changing a characteristic of the filter based on a phase associated with a portion of the data being processed by the filter.

6. The method of claim 1, further comprising:
the processing comprises generating a first stream of data and a second stream of data and providing the first and second streams of data to the filter, wherein
the processing comprises selectively changing a characteristic of the filter based on whether the first stream of data or the second stream of data is being filtered by the filter.

7. The method of claim 1, wherein the processing is further based on whether data being filtered by the filter is circuit switched data or packet switched data.

8. An apparatus comprising:
a filter to filter a frame of data received from a wireless network, the frame comprising data associated with a first data type and data associated with a second data type; and
a controller to:
control the filter to cause the filter to exhibit a first frequency response when the filter is filtering the data associated with the first data type; and
control the filter to exhibit a second frequency response different from the first frequency response when the filter is filtering the data associated with the second data type.

9. The apparatus of claim 8, wherein the controller is adapted to change coefficients of the filter in response to the type.

10. The apparatus of claim 8, wherein the filter comprises a tapped filter.

11. The apparatus of claim 8, wherein the first frequency response comprises a wide band response and the second frequency response comprises a narrow band response.

12. The apparatus of claim 8, wherein the controller is adapted to control the filter based on a data type associated with a slot of the frame.

13. The apparatus of claim 8, wherein the controller is adapted to control the filter based on a phase associated with a portion of the data being processed by the filter.

14. The apparatus of claim 8, wherein the filter receives oversampled data comprising a first stream of data and a second stream of data, and
the controller is adapted to control the filter based on whether the filter is filtering the first stream of data or the second stream of data.

15. The apparatus of claim 8, wherein the first data type is associated with packet switched data and the second data type is associated with circuit switched data.

* * * * *